United States Patent
Fukui et al.

(10) Patent No.: US 7,400,953 B2
(45) Date of Patent: Jul. 15, 2008

(54) VEHICLE METER UNIT

(75) Inventors: Naoki Fukui, Wako (JP); Tamon Kimura, Wako (JP); Izumi Takatsudo, Wako (JP); Masaki Sato, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 976 days.

(21) Appl. No.: 10/608,379

(22) Filed: Jun. 27, 2003

(65) Prior Publication Data

US 2004/0153782 A1 Aug. 5, 2004

(30) Foreign Application Priority Data

Jul. 5, 2002 (JP) ............................. 2002-197410
May 8, 2003 (JP) ............................. 2003-130744

(51) Int. Cl.
*F02N 11/08* (2006.01)

(52) U.S. Cl. ........................................ 701/29; 702/182

(58) Field of Classification Search .................. 701/29, 701/30, 31, 34, 35, 33, 36, 50, 2, 110, 115, 701/113; 702/187, 182–185; 340/438, 459, 340/461, 462, 525; 73/116

See application file for complete search history.

(56) References Cited

U.S. PATENT DOCUMENTS

| | | | | |
|---|---|---|---|---|
| 5,796,936 A | * | 8/1998 | Watabe et al. | 358/1.9 |
| 5,880,710 A | * | 3/1999 | Jaberi et al. | 345/618 |
| 5,949,330 A | * | 9/1999 | Hoffman et al. | 340/438 |
| 6,212,483 B1 | * | 4/2001 | Carew et al. | 702/183 |
| 6,320,497 B1 | * | 11/2001 | Fukumoto et al. | 340/425.5 |
| 6,493,616 B1 | * | 12/2002 | Rossow et al. | 701/29 |
| 6,577,934 B2 | * | 6/2003 | Matsunaga et al. | 701/29 |
| 6,587,767 B2 | * | 7/2003 | Letang et al. | 701/29 |

FOREIGN PATENT DOCUMENTS

JP 5-201294 8/1993

* cited by examiner

*Primary Examiner*—Dalena Tran
(74) *Attorney, Agent, or Firm*—Hamre, Schumann, Mueller & Larson

(57) ABSTRACT

A vehicle meter unit has a control unit and a controller area network (CAN) constituting a communications network. On-vehicle systems such as an engine control system, anti-lock braking system and electric power steering system are also provided with CANs and fault diagnostic functions for decentralized control. Faults in the systems are displayed in fault codes through the control unit on a liquid crystal display on which the indications of an odometer and trip recorder are displayed.

5 Claims, 9 Drawing Sheets

VEHICLE METER UNIT

FIELD OF THE INVENTION

The present invention relates to a vehicle meter unit for indicating a vehicle speed, an engine RPM, total mileage and for displaying fault diagnostic information fed from systems such as an engine control system, anti-lock braking system and electric power steering system.

BACKGROUND OF THE INVENTION

Japanese Patent Laid-Open Publication No. HEI-5-201294, for example, discloses a method for diagnosing faults in such vehicle systems using a fault diagnostic device. Such a fault diagnostic system is schematically shown in FIG. 9 hereof.

In the system of FIG. 9, diagnosis of faults in an engine control system 212, anti-lock braking system 213, electric power steering system 214 and certain other system 215 is performed by a fault diagnostic device 201 connected to the systems 212-215 to read the results of self-diagnosis done by the systems 212-215 as self-diagnostic data.

The fault diagnostic device 201 consists of a main unit 202 for directly accessing the systems of the vehicle to read self-diagnostic data of faults or the like, a cord 203 extending from the main unit 202, and a connector terminal 204 attached to the distal end of the cord 203. Reference numeral 205 denotes a display for providing self-diagnostic data, and 206 operation keys for accessing the systems 212 to 215.

In the figure, reference numeral 200 denotes a vehicle, and 208 a plug to which the connector terminal 204 of the fault diagnostic device 201 is connected to read the self-diagnostic data of the systems 212-215.

In the above fault diagnostic operation, however, to perform fault diagnosis of the engine control system 212, anti-lock braking system 213, electric power steering system 214 and the like, it is required to provide the fault diagnostic device 201 and connect the connector terminal 204 of the fault diagnostic device 201 to the plug 208 for fault diagnosis of the systems 212-215. In short, the fault diagnostic operation of the systems 212-215 is complicated and time-consuming.

Further, the above fault diagnostic operation cannot be performed without the fault diagnostic device 201, and is unsuitable for emergent fault diagnostic operation on a street or in parking.

It is thus desired to be able to swiftly proceed with fault diagnostic operation and to perform the operation also on a street or in parking.

SUMMARY OF THE INVENTION

According to an aspect of the present invention, there is provided a vehicle meter unit having the function of receiving fault diagnostic information from systems including an engine control system, an anti-lock braking system and an electric power steering system which are provided with respective CAN controllers constituting a communications network in a vehicle and fault diagnostic functions, and the function of displaying the infor-mation, which vehicle meter unit comprises: a CAN controller for communicating with the systems; and a control unit for transmitting via the CAN controller a command to perform fault diagnosis to the systems, causing the systems to transmit fault codes based on the command and directing to display the fault codes.

For improving driver's convenience, it is desirable that arrangements be made for fault diagnosis of plural systems to be implemented swiftly anywhere.

To this end, systems such as the engine control system, anti-lock braking system and electric power steering system are respectively provided with a CAN controller and fault diagnostic function, so as to decentralize fault diagnostic functions and to allow exchanges of information between the systems.

Such CAN controllers have communication functions used for forming a network between systems such as the engine control system, anti-lock braking system and electric power steering system.

Provision of the control unit and the CAN controller in the vehicle meter unit allows high-speed information exchange with the systems. Specifically, the vehicle meter unit of the present invention transmits via the CAN controller a command to perform fault diagnosis to the systems, causing the systems to transmit fault codes based on the command, and displays the fault codes, so that fault diagnosis can be performed without using a fault diagnostic device. As a result, fault diagnosis of the systems can be swiftly conducted and performed anywhere.

The control unit in the present invention is preferably linked to the systems by radio. As a result, an expensive wiring harness, for example, can be eliminated for reduced wiring costs.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
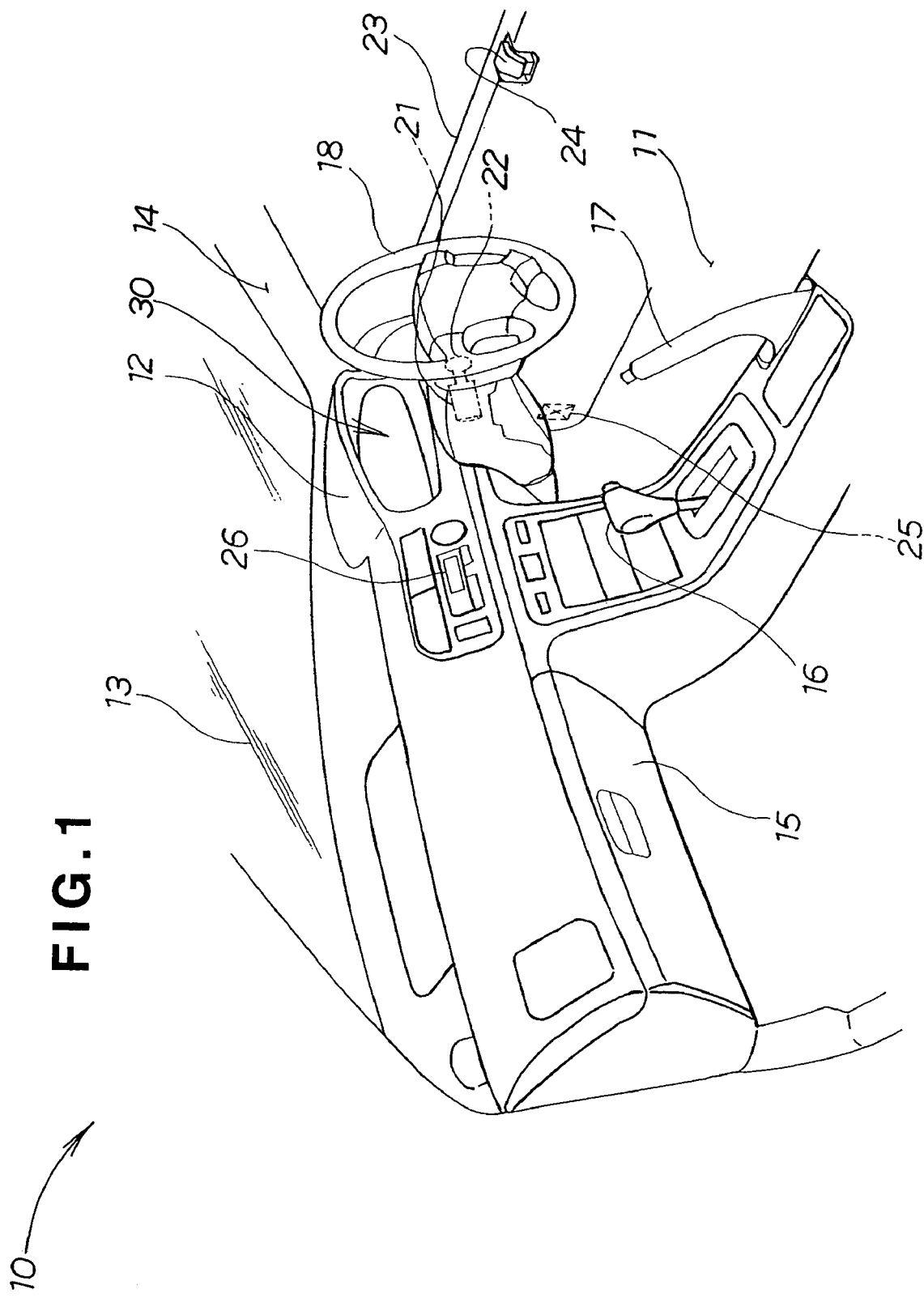
FIG. 1 is a perspective view of a passenger compartment equipped with a vehicle meter unit according to the present invention.

Initial reference is made to FIG. 1 showing in perspective a passenger compartment equipped with a vehicle meter unit according to the present invention. In the figure, reference numeral 10 denotes a vehicle, 11 a passenger compartment, 12 an instrument panel, 13 a windshield, 14 an A-pillar, 15 a glove box, 16 a shift lever, 17 a handbrake, 18 a steering wheel, 21 an ignition switch, 22 an ignition key, 23 a door, 24 a door lock, 25 a door switch, and 26 a clock.

A vehicle meter unit 30 according to the present invention has a controller area network (CAN) controller 121 forming a communications network in the vehicle and a control unit 101 for transmitting via the CAN controller a command to perform fault diagnosis to the systems such as the engine control system, anti-lock braking system and electric power steering system, causing the systems to transmit fault codes based on the command, and directing to display the fault codes.

Figure 2:
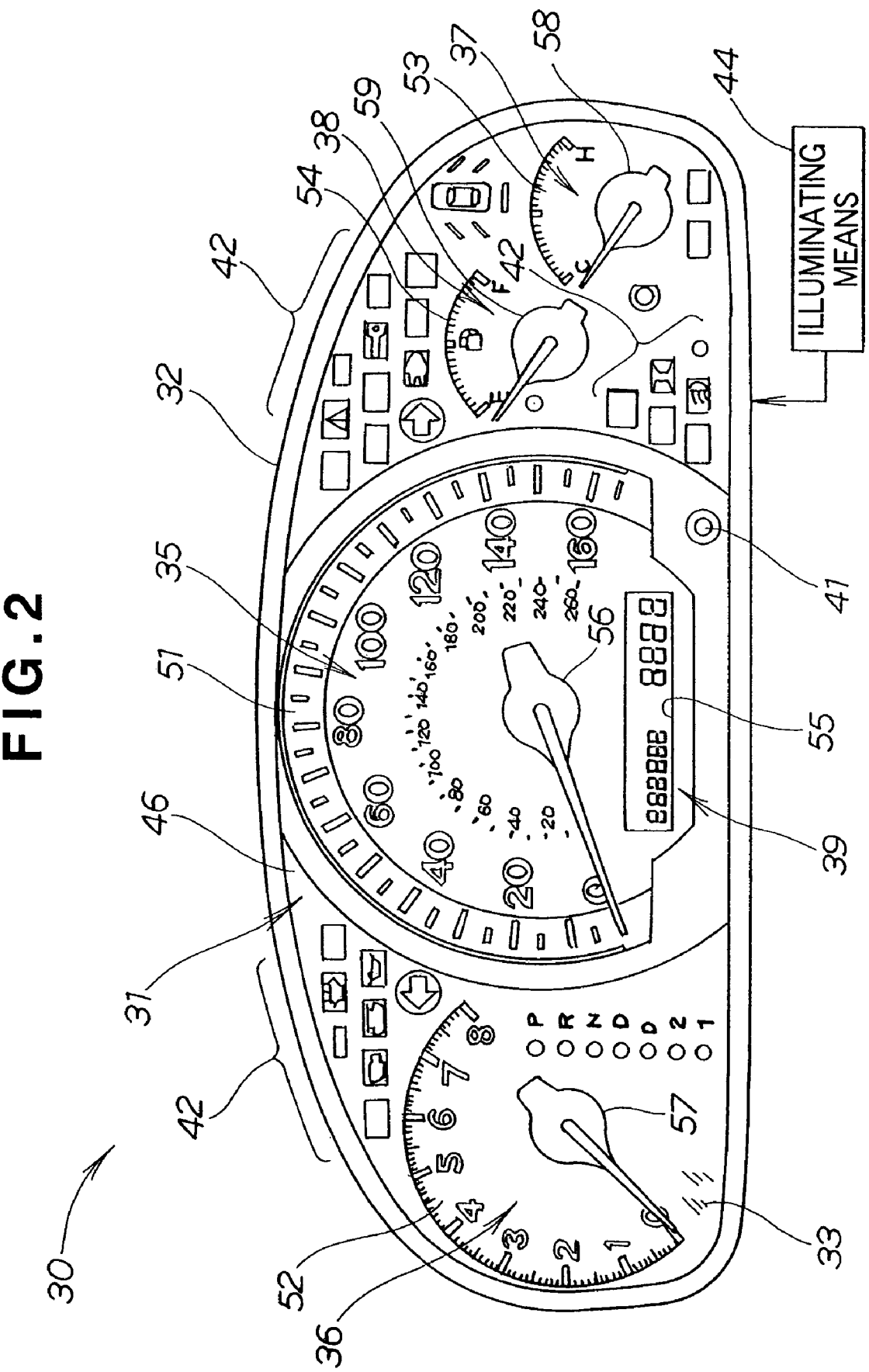
FIG. 2 is a detailed front view of the vehicle meter unit shown in FIG. 1.

Reference is made next to FIG. 2 illustrating in front elevation the vehicle meter unit 30 of the present invention. The vehicle meter unit 30 consists of a meter indicator portion 31 for presenting vehicle information, time information, driving conditions information and the like, a housing 32 containing the meter indicator portion 31, and a clear cover 33 put over the housing 32 to transparently cover the meter indicator portion 31.

The meter indicator portion 31 has a speedometer 35 as a vehicle meter for indicating the vehicle speed, a tachometer 36 as a vehicle meter for indicating the engine RPM, a coolant temperature gauge 37 for indicating the temperature of coolant, a fuel gauge 38 for indicating the remaining amount of fuel, a liquid crystal display 39 for displaying, in some combination or selectively, total mileage, traveled distance, outside air temperature and fault codes, a switch 41 for switching the combined displayed contents or the selectively displayed contents of the liquid crystal display 39, warning indications 42 for giving warnings or alerts, and an illuminating means 44 for illuminating the speedometer 35, tachometer 36, coolant temperature gauge 37, fuel gauge 38 and liquid crystal display 39.

In the figure, reference numeral 46 denotes an integrated character board for providing graphics and characters of the meter indicator portion 31, integrally formed with a dial 51 of the speedometer 35, a dial 52 of the tachometer 36, a dial 53 of the coolant temperature gauge 37, a dial 54 of the fuel gauge 38, a display window 55 of the liquid crystal display 39, and the warning indications 42.

Reference numeral 56 denotes a needle of the speedometer 35, 57 a needle of the tachometer 36, 58 a needle of the coolant temperature gauge 37, and 59 a needle of the fuel gauge 38.

Figure 3:
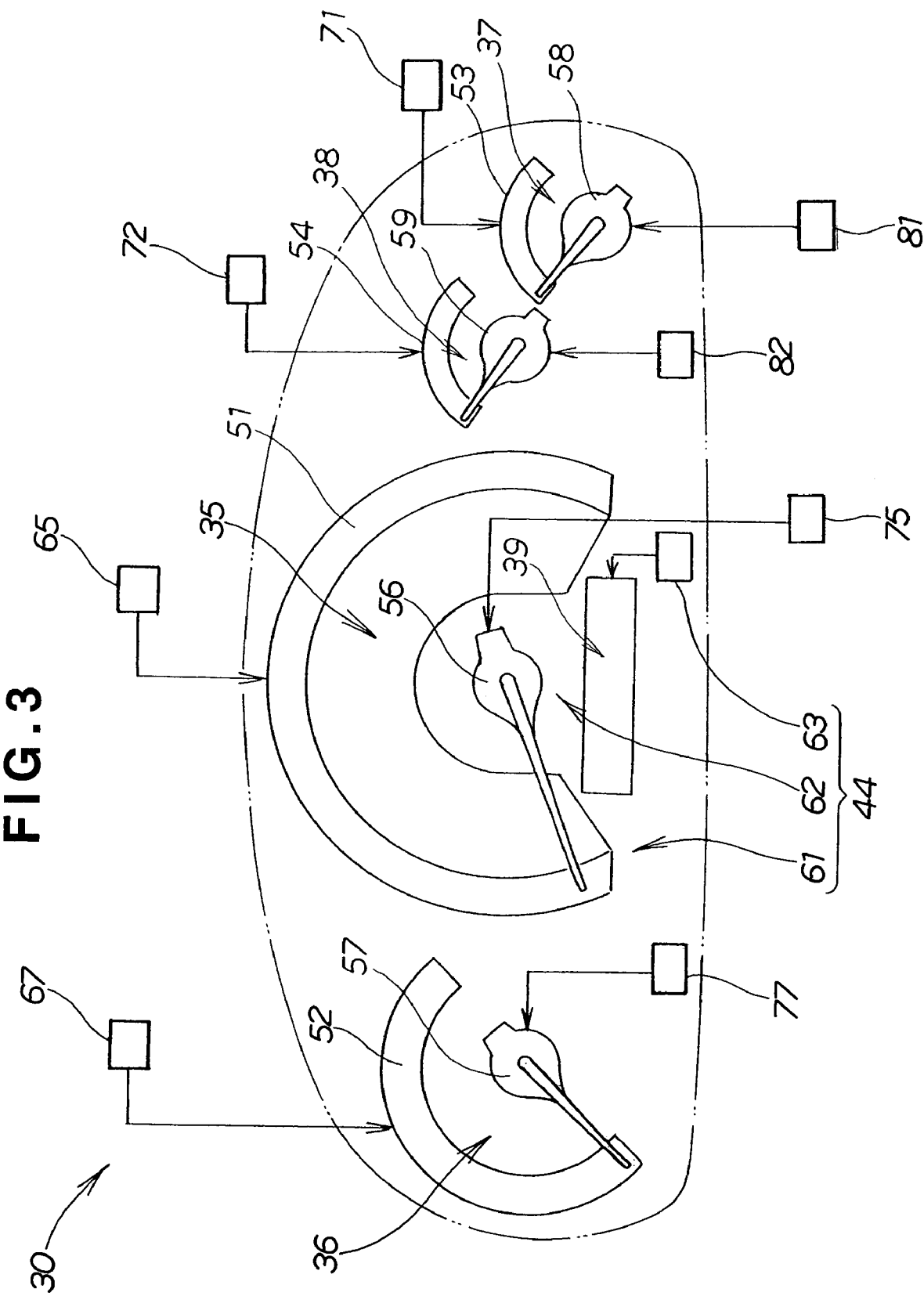
FIG. 3 is a detailed view of an illuminating means used in the vehicle meter unit shown of FIG. 2.

FIG. 3 is a block diagram illustrating the illuminating means 44 in the vehicle meter unit 30 according to the present invention. The illuminating means 44 includes a dial illuminating means 61 for illuminating the dials 51 to 54, a needle illuminating means 62 for illuminating the needles 56 to 59, and a liquid-crystal-illuminating LED (light emitting diode) 63 for illumi-nating the liquid crystal display 39.

The dial illuminating means 61 consists of a group of character-illuminating LEDs 65 for illuminating the dial 51 of the speedometer 35, a group of character-illuminating LEDs 67 for illuminating the dial 52 of the tachometer 36, a group of character-illuminating LEDs 71 for illuminating the dial 53 of the coolant temperature gauge 37, and a group of character-illuminating LEDs 72 for illuminating the dial 54 of the fuel gauge 38.

The character-illuminating LED groups 65 and 67 use green LEDs, and the character-illuminating LED groups 71 and 72 use amber LEDs, for example.

The needle illuminating means 62 consists of a group of needle-illuminating LEDs 75 for illuminating the needle 56 of the speedometer 35, a group of needle-illuminating LEDs 77 for illuminating the needle 57 of the tachometer 36, a group of needle-illuminating LEDs 81 for illuminating the needle 58 of the coolant temperature gauge 37, and a group of needle-illuminating LEDs 82 for illuminating the needle 59 of the fuel gauge 38.

Now, the configuration of the speedometer (vehicle meter) 35 will be described.

Figure 4:
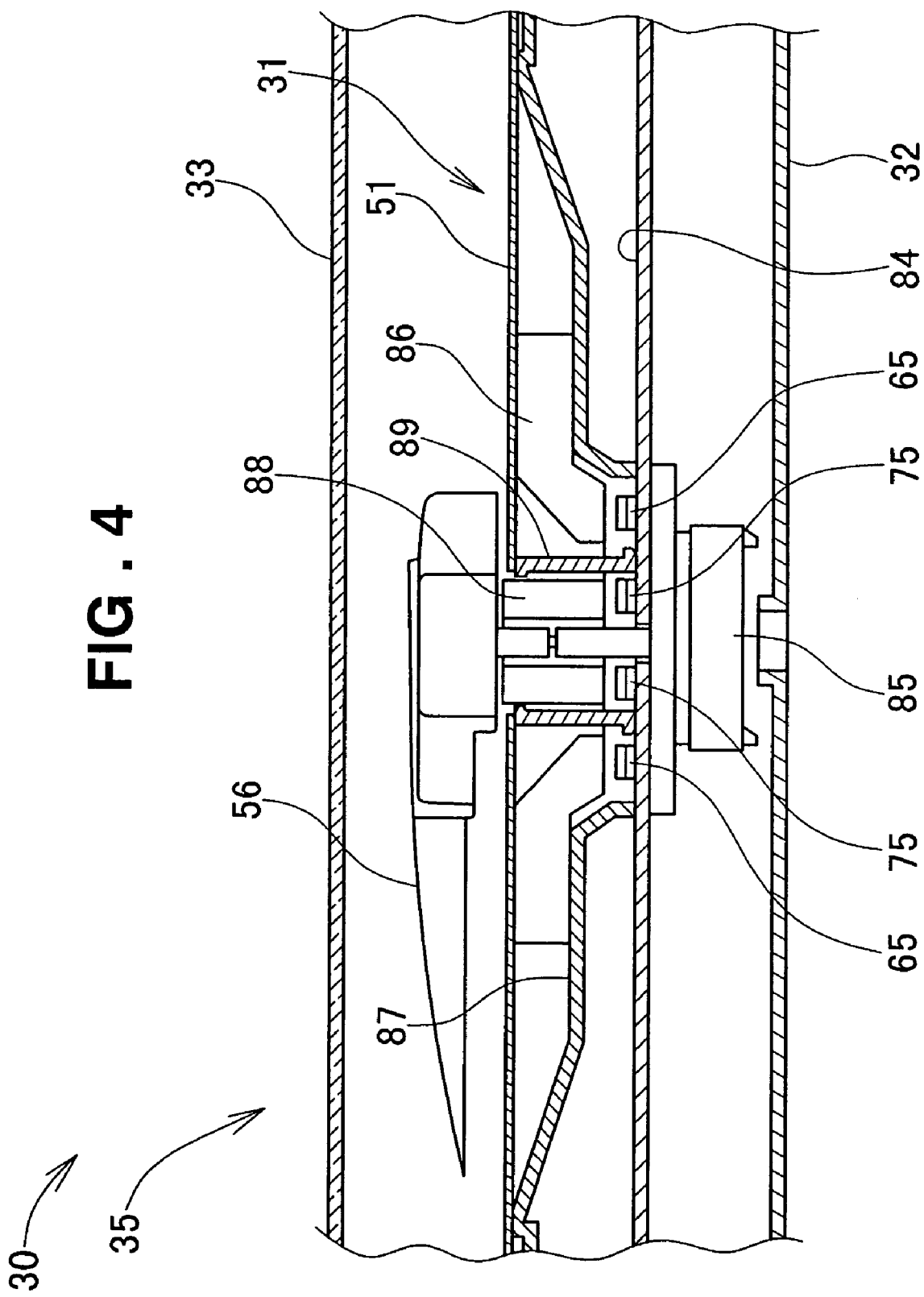
FIG. 4 is a cross-sectional view of a speedometer in the vehicle meter unit shown in FIG. 2.

FIG. 4 is a side cross-sectional view of the vehicle meter 35 according to the present invention. The speedometer 35 consists of a base plate 84 supported on the housing 32, a meter body 85 mounted on the base plate 84, the needle 56 mounted on the meter body 85, the dial 51 for indicating the vehicle speed at the position pointed by the needle 56, the character-illuminating LED group 65 for illuminating the dial 51, a dial light guide 86 for guiding light of the character-illuminating LED group 65 to the dial 51, an illumination case 87 enclosing the dial light guide 86 to prevent the leakage of light of the character-illuminating LED group 65 and also serving as a reflector, the needle-illuminating LED group 75 for illuminating the needle 56, a needle light guide 88 for guiding light of the needle-illuminating LED group 75 to the needle 56, and a partitioning member 89 for separating the needle light guide 88 from the dial light guide 86.

The tachometer 36, coolant temperature gauge 37 and fuel gauge 38 shown in FIG. 2 each have a substantially identical configuration to that of the speedometer 35, and will not be described in detail.

The base plate 84 is a single base plate on which the speedometer 35, tachometer 36, coolant temperature gauge 37, fuel gauge 38 and liquid crystal display 39 are mounted.

Figure 5:
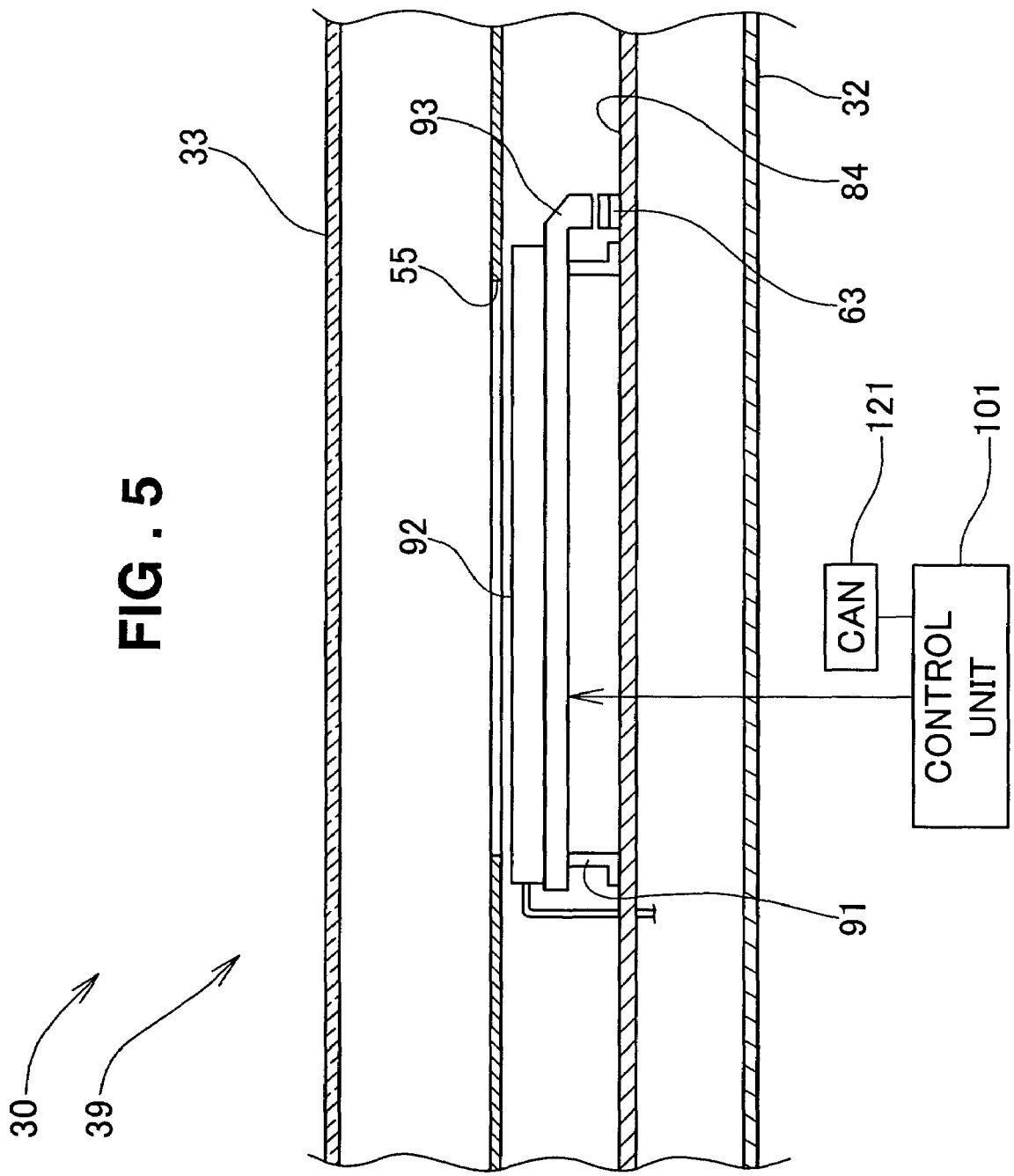
FIG. 5 is a cross-sectional view of a liquid crystal display in the vehicle meter unit shown in FIG. 2.

FIG. 5 is a side cross-sectional view of the liquid crystal display 39 in the vehicle meter unit 30 according to the present invention. The liquid crystal display 39 consists of the base plate 84 on which the speedometer 35 (see FIG. 4) and other components are mounted, a liquid crystal device (LCD) 92 mounted on the base plate 84 via a holder 91, a display window 55 formed in the integrated character board 46 for allowing the liquid crystal device 92 to be seen through the integrated character board 46, the liquid-crystal-illuminating LED 63 mounted on the base plate 84 for illuminating the liquid crystal device 92, and a liquid crystal light guide 93 for guiding light from the liquid-crystal-illuminating LED 63 to the liquid crystal device 92. The vehicle meter unit 30 has a controller area network (CAN) controller 121 forming a communications network in the vehicle, and a control unit 101 for transmitting, via the CAN controller 121, a command to perform fault diagnosis to the systems such as the engine control system, anti-lock braking system and electric power steering system, causing the systems to transmit fault codes based on the command, and directing to display the fault codes.

Now, a system for displaying fault codes will be described.

Figure 6:
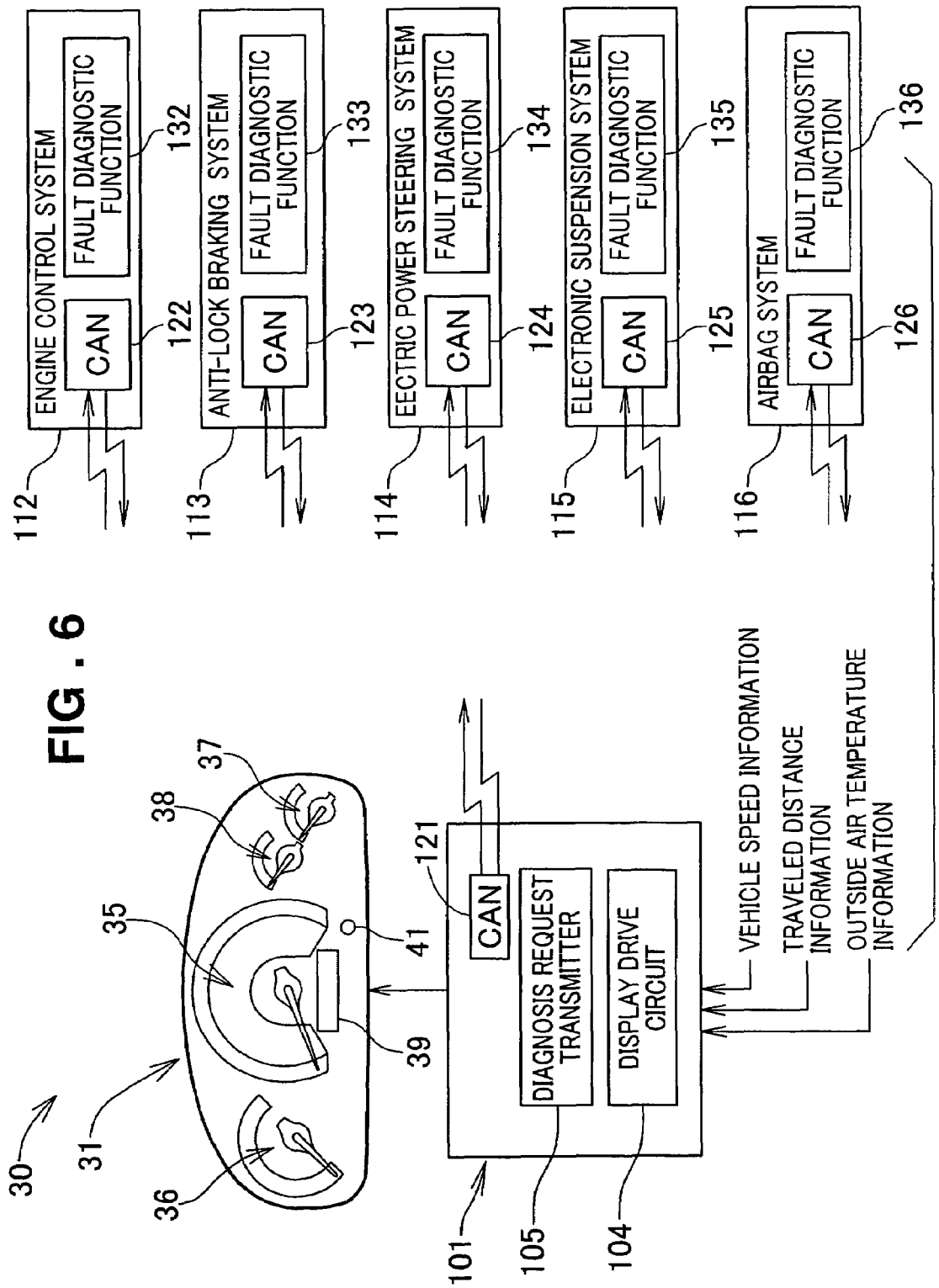
FIG. 6 is a block diagram illustrating control of the vehicle meter unit according to the present intention.

FIG. 6 is a control block diagram of the vehicle meter unit 30 according to the present invention. Systems herein mentioned are systems mounted on the vehicle such as an engine control system 112 for controlling the engine, an anti-lock braking system 113 for controlling brakes, an electric power steering system 114 for controlling the steerage of the steering wheel, an electronic suspension system 115 for controlling the states of suspensions and an air bag system 116 for passenger protection, for example.

The engine control system 112 forms a network with the systems 113 to 116 and the vehicle meter unit 30, having a CAN controller 121 for receiving and transmitting information from or to the systems 113 to 116 and the vehicle meter unit 30, and a fault diagnostic function 132 of diagnosing the state of a fault to output a predetermined fault code.

The other systems 113 to 116 have, like the engine control system 112, CAN controllers 123 to 126 and fault diagnostic functions 133 to 136. The vehicle meter unit 30 and the systems 112 to 116 form a network using the CAN controllers 121 to 126.

The CAN controllers 121 to 126 are microcomputers or LSIs (large-scale integrated circuits) having transmitting-receiving functions used for forming a network between the systems 112 to 116 including the engine control system 112, anti-lock braking system 113 and electric power steering system 114.

In the figure, reference numeral 123 designates a CAN controller of the anti-lock braking system 113, 124 a CAN controller of the electric power steering system 114, 125 a CAN controller of the electronic suspension system 115, and 126 a CAN controller of the air bag system 116. Reference numeral 133 denotes a fault diagnostic function of the anti-lock braking system 113, 134 a fault diagnostic function of the electric power steering system 114, 135 a fault diagnostic function of the electronic suspension system 115, and 136 a fault diagnostic function of the air bag system 116.

The vehicle meter unit 30 having the transmitting-receiving functions in the CAN controllers 121 to 126 links by radio the systems 112 to 116 to the control unit 101. As a result, an expensive wiring harness, for example, can be eliminated for reduction in wiring costs.

The control unit 101 has a display drive circuit 104 for displaying the total mileage, traveled distance and outside air temperature in some combination on the liquid crystal device 92 (see FIG. 5) by getting speed information, traveled distance information and outside air temperature information, and for selectively displaying fault code information of the systems 112 to 116 on the liquid crystal device 92 by forming a network between the vehicle meter unit 30 and the systems 112 to 116 using the CAN controllers 121 to 126, and a diagnosis request transmitter 105 for transmitting a command to perform fault diagnosis to the systems 112 to 116, causing the systems 112 to 116 to transmit fault codes based on the command.

In summary, the vehicle meter unit 30 in this embodiment has the CAN controller 121 for communicating with the systems 112 to 116 and the control unit 101 for transmitting via the CAN controller 121 a command to perform fault diagnosis to the systems 112 to 116, causing the systems 112 to 116 to transmit fault codes based on the command, and directing to display the fault codes.

It is preferable to be able to swiftly proceed with system fault diagnosis and to perform system fault diagnosis anywhere, for example, for driver's enhanced convenience.

The present invention provides the systems 112 to 116 including the engine control system 112, anti-lock braking system 113 and electric power steering system 114 with the CAN controllers 122 to 126 and the fault diagnostic functions 132 to 136, so as to decentralize the fault diagnostic functions 132 to 136 and to allow exchanges of information between the systems 112 to 116.

Further, the provision of the CAN controller 121 in the vehicle meter unit 30 allows high-speed information exchange with the systems 112 to 116. The control unit 101 is provided in the vehicle meter unit 30 to transmit via the CAN controller 121 a command to perform fault diagnosis to the systems 112 to 116, causing the systems 112 to 116 to transmit fault codes based on the command, and display the fault codes.

The vehicle meter unit 30 is provided with the CAN controller 121 for exchanging information with the systems 112 to 116, and the control unit 101 for transmitting, via the CAN controller 121, a command to perform fault diagnosis to the systems 112 to 116, causing the systems 112 to 116 to transmit fault codes based on the command, and directing to display the fault codes, so that fault diagnosis can be performed without using a fault diagnostic device, for example. As a result, system fault diagnosis can be swiftly implemented and performed anywhere.

The results of fault diagnosis by the fault diagnostic functions 132 to 136 of the respective systems 112 to 116 including the engine control system 112, anti-lock braking system 113 and electric power steering system 114 of the vehicle can be directly displayed on the vehicle meter unit 30, which results in a simplified fault diagnostic system.

Figure 7:
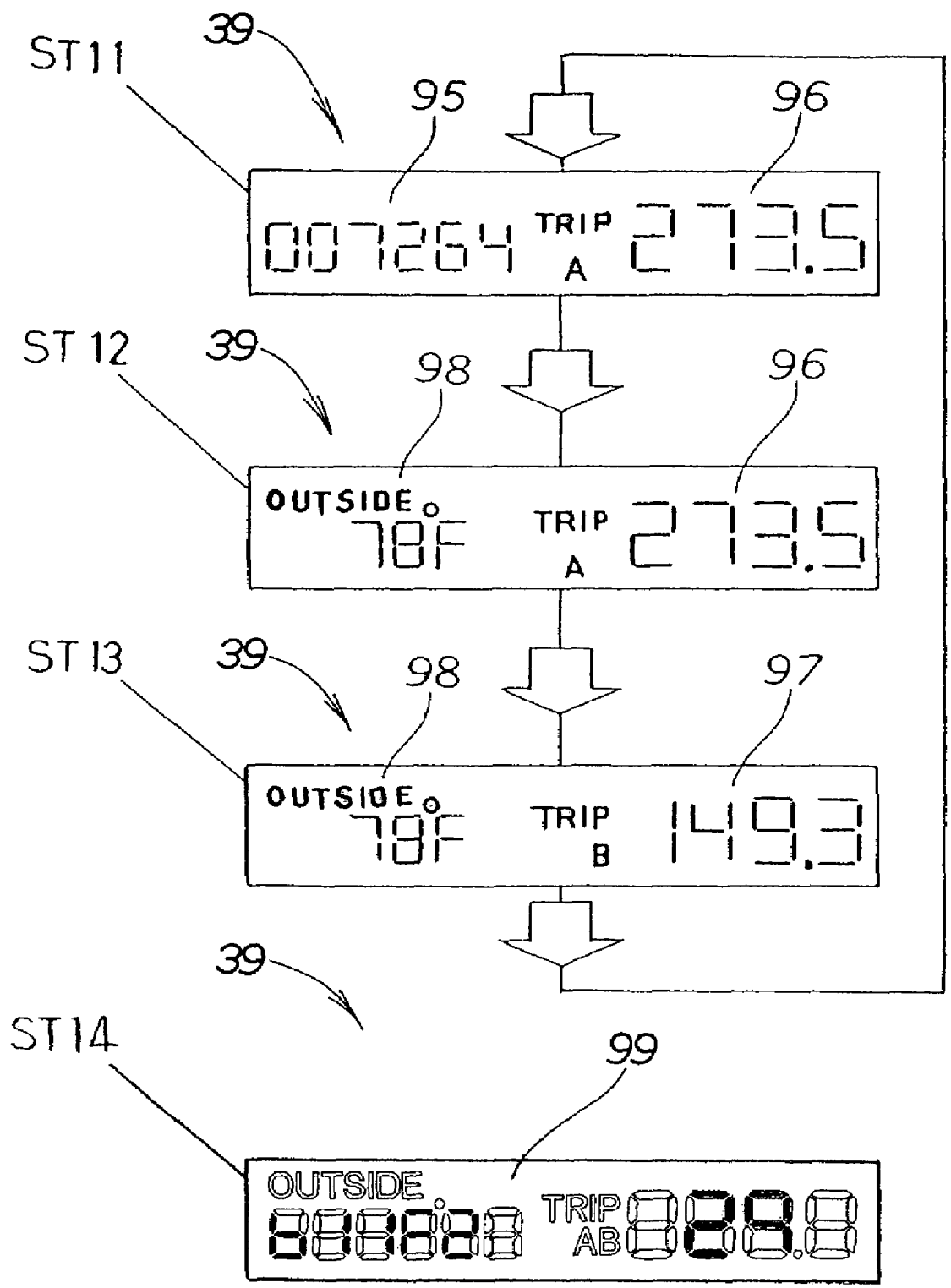
FIG. 7 is a diagram illustrating display patterns displayed on a liquid crystal display shown in FIG. 6.

FIG. 7 illustrates display patterns switched on the liquid crystal display 39 of the vehicle meter unit 30.

ST11: An odometer 95 indicating the total mileage and a first trip recorder 96 (TRIP A) indicating a certain traveled distance are displayed in combination.

ST12: The switch 41 shown in FIG. 2 is pushed to switch to the display of combination of an outside air temperature indication 98 and the first trip recorder 96.

ST13: The switch 41 is again pushed to switch to the display of combination of the outside air temperature indication 98 and a second trip recorder (TRIP B). ST11 to ST13 are displayed in rotation by pushing the switch 41.

ST14: With the engine stopped and the ignition switch 21 (see FIG. 1) turned ON, the switch 41 (see FIG. 2) is pushed for as long as three seconds or more to enter the fault diagnostic mode. As described with FIG. 6, a command to perform fault diagnosis is transmitted via the CAN controller 121 to the systems 112 to 116, causing the systems 112 to 116 to transmit fault codes 99 based on the command, and the fault codes 99 are displayed (e.g., "611F2 29"). The displayed fault codes 99 are checked by referring to the manual and handled appropriately.

Figure 8:
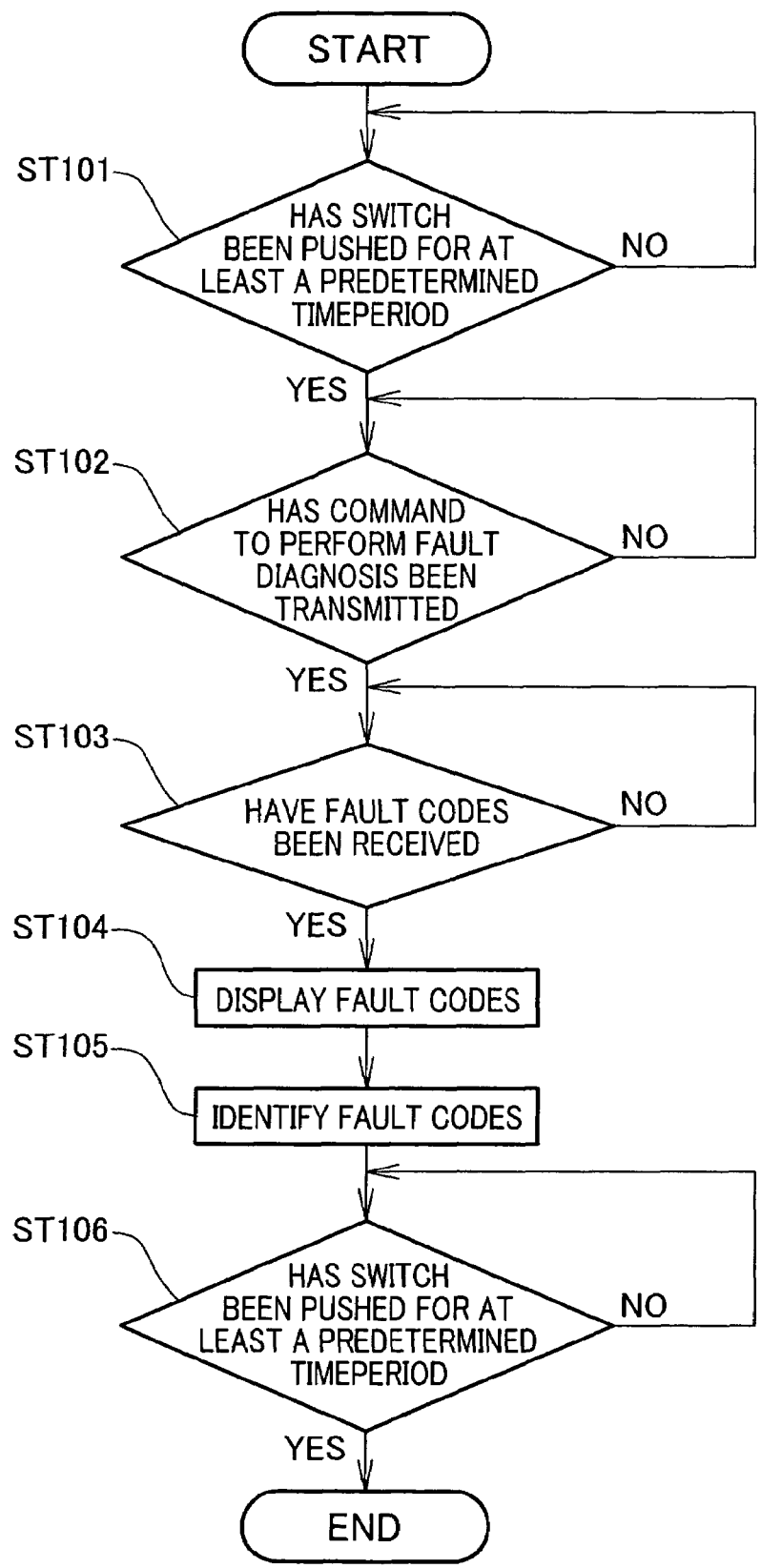
FIG. 8 is a flowchart illustrating an operation of a control unit in the vehicle meter unit according to the present invention.
Figure 9:
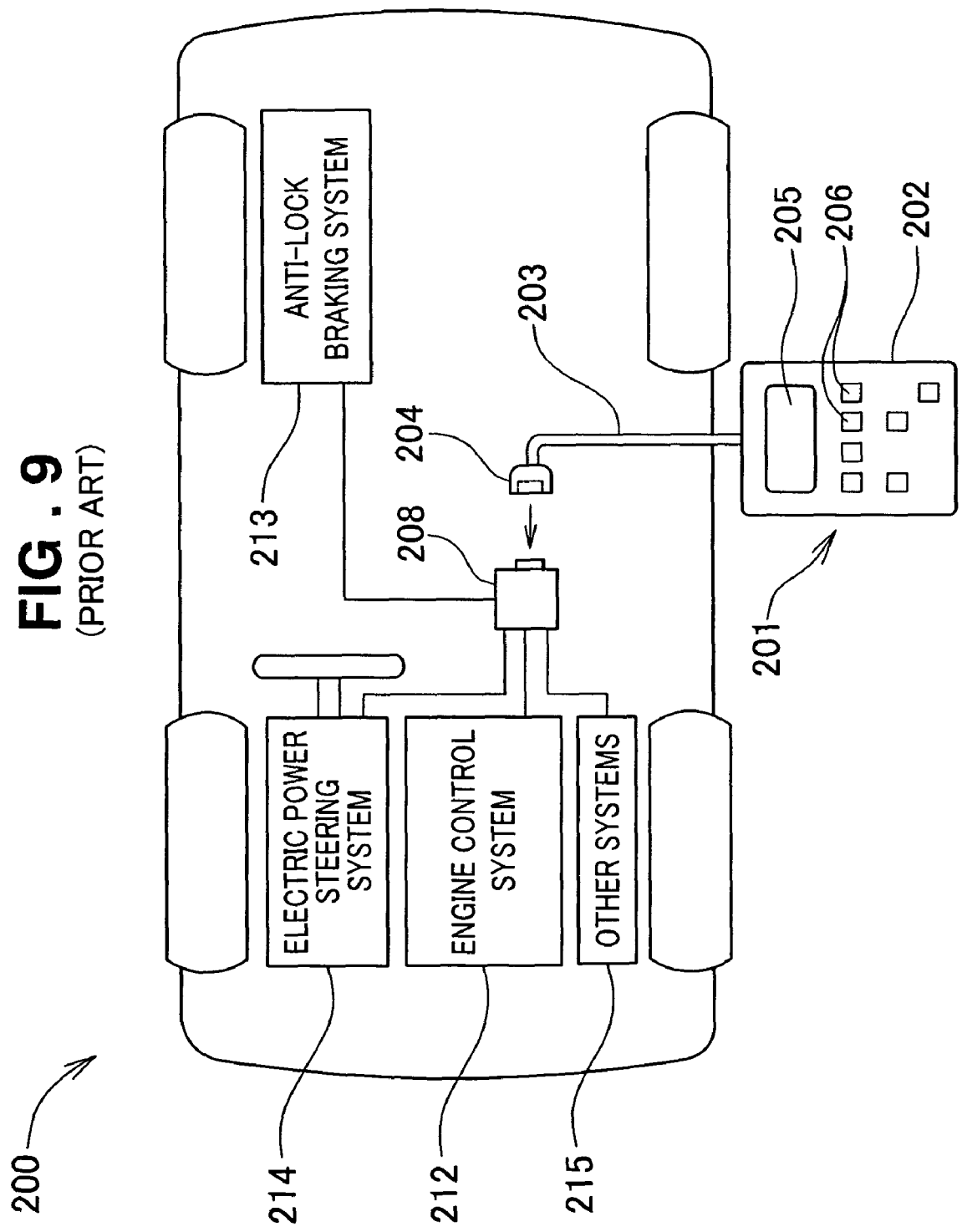
FIG. 9 is a schematic block diagram illustrating a conventional vehicle meter unit.

Now, the operation of the control unit 101 in the vehicle meter unit 30 according to the present invention will be described with a flowchart shown in FIG. 8.

Step (hereinafter abbreviated to ST) 101: It is determined whether the switch 41 has been pushed for at least a predetermined time period with the engine stopped and the ignition switch 21 (see FIG. 1) turned ON. The predetermined time period is three seconds for or over which the switch 41 is to be continuously pushed. When the answer is YES, the process proceeds to ST102, and when NO, returns to the start.

ST102: It is determined whether a command to perform fault diagnosis has been transmitted via the CAN controller 121 shown in FIG. 6 to the systems 112 to 116. When the answer is YES, the process proceeds to ST103, and when NO, repeats ST102.

ST103: It is determined whether fault codes have been received from the systems 112 to 116. When the answer is YES, the process proceeds to ST104, and when NO, repeats ST103.

ST104: The display drive circuit 104 of the control unit 101 directs the liquid crystal display 39 to display the fault codes.

ST105: The switch 41 is pushed. Every time the switch 41 is pushed, a different fault code is displayed. When three fault codes are transmitted from the CAN controllers 122 to 126, for example, the three fault codes are displayed in rotation by pushing the switch 41. The fault codes are identified with fault conditions by referring to the manual.

ST106: It is determined whether the switch 41 has been pushed for at least a predetermined time period. The predetermined time period is three seconds for or over which the switch 41 is to be continuously pushed. When the answer is YES, the process is terminated, and when NO, repeats ST106. In other words, by pushing the switch 41 for at least three seconds, the display returns to the initial state. Thus, the combination of the odometer 95 and the first trip recorder 96 (TRIP A) as shown in FIG. 7 is displayed.

In this embodiment, the systems such as the engine control system 112, anti-lock braking system 113 and electric power steering system 114 as shown in FIG. 6 have been exemplarily mentioned, but the present invention is not limited thereto. Systems required in the vehicle such as a seatbelt control system and a four-wheel drive system may be included.

In this embodiment, the odometer 95, first trip recorder 96 (TRIP A), second trip recorder 97 (TRIP B), outside air temperature indication 98 and fault codes 99 are displayed in some combination or selectively on the liquid crystal display 39 as shown in FIG. 7, which is not limiting. Fault codes may be displayed on another area.

In this embodiment, the systems 112 to 116 are linked to the vehicle meter unit 30 by radio as shown in FIG. 6, but the present invention is not limited thereto. Cables may be used for the links.

The present disclosure relates to the subject matters of Japanese Patent Applications No. 2002-197410, filed Jul. 5, 2002, and No. 2003-130744, filed May 8, 2003, the disclosures of which are expressly incorporated herein by reference in their entireties.

What is claimed is:

1. A vehicle meter unit for receiving fault diagnostic information from systems, including an engine control system, an anti-lock braking system and an electric power steering system which have respective system CAN controllers forming a communications network in the vehicle and fault diagnostic functions, and displaying the information, said vehicle meter unit comprising:

a vehicle meter unit CAN controller for communicating with said systems; and a control unit for, when an engine of the vehicle is stopped and an ignition switch has been turned on, transmitting via said vehicle meter unit CAN controller a command to perform fault diagnosis to said systems, causing said systems to transmit fault codes based on the command, and directing to display the fault codes.

2. A meter unit according to claim 1, wherein said system CAN controllers have respective transmitting-receiving functions, and said vehicle meter unit CAN controller of said control unit is linked to the respective system CAN controllers by radio in the vehicle.

3. A meter unit according to claim 1, further comprising a liquid crystal display and a switch that are linked with the control unit such that the fault codes transmitted from the respective systems can be selectively displayed on the liquid crystal display using the switch under the control of the control unit, wherein the control unit has a diagnosis request transmitter for transmitting the command to perform the fault diagnosis to the systems when the switch has been solely pushed continuously for at least a predetermined period of time with the engine stopped and the ignition switch turned on.

4. A meter unit according to claim 3, wherein when plural fault codes are transmitted from the corresponding ones of the systems, the fault codes are displayed on the liquid crystal display sequentially one at a rime when the switch is pushed.

5. A meter unit according to claim 3, wherein when the switch has been solely pushed against for at least said predetermined period of time, the fault diagnosis is terminated.

* * * * *